(12) United States Patent
Appel

(10) Patent No.: US 11,879,284 B2
(45) Date of Patent: Jan. 23, 2024

(54) DEVICE AND METHOD FOR CONFIGURING A CLAMPING DETECTION SYSTEM

(71) Applicant: WEBASTO SE, Stockdorf (DE)

(72) Inventor: Josef Appel, Stockdorf (DE)

(73) Assignee: WEBASTO SE, Stockdorf (DE)

(*) Notice: Subject to any disclaimer, the term of this patent is extended or adjusted under 35 U.S.C. 154(b) by 853 days.

(21) Appl. No.: 16/962,069

(22) PCT Filed: Jan. 10, 2019

(86) PCT No.: PCT/EP2019/050590
§ 371 (c)(1),
(2) Date: Jul. 14, 2020

(87) PCT Pub. No.: WO2019/141589
PCT Pub. Date: Jul. 25, 2019

(65) Prior Publication Data
US 2020/0392777 A1   Dec. 17, 2020

(30) Foreign Application Priority Data

Jan. 18, 2018 (DE) ............. 10 2018 101 069.9

(51) Int. Cl.
*G01L 25/00* (2006.01)
*E05F 15/41* (2015.01)
(Continued)

(52) U.S. Cl.
CPC ............. *E05F 15/41* (2015.01); *B60J 7/0573* (2013.01); *E05F 15/60* (2015.01); *G01L 25/00* (2013.01); *E05Y 2201/434* (2013.01); *E05Y 2400/502* (2013.01); *E05Y 2900/542* (2013.01); *H02P 29/00* (2013.01)

(58) Field of Classification Search
CPC ......... E05F 15/41; E05F 15/60; B60J 7/0573; G01L 25/00; E05Y 2201/434; E05Y 2400/502; E05Y 2900/542; H02P 29/00
(Continued)

(56) References Cited

U.S. PATENT DOCUMENTS 6,064,165 A   5/2000   Boisvert
6,100,658 A * 8/2000   Kume ................... B60J 7/0573
                                                  318/266
(Continued)

FOREIGN PATENT DOCUMENTS

CN   102575494 A   7/2012
CN   102635287 A   8/2012
(Continued)

OTHER PUBLICATIONS

International Searching Authority. International Search Report and Written Opinion for application PCT/EP2019/050590, dated Apr. 26, 2019. With translation.
(Continued)

*Primary Examiner* — Max H Noori
(74) *Attorney, Agent, or Firm* — Quarles & Brady LLP

(57) ABSTRACT

A device for configuring a jamming detection system having an adjusting device including an electric motor for closing at least one opening in a vehicle, such as a sliding roof. The device is provided with a processor which reads measured parameters of the electric motor and parameters of the jamming detection system, calculates individual correlation variables from the measured parameters of the electric motor and of the jamming detection system, and stores the calculated individual correlation variables in a motor controller of the adjusting device, wherein the calculated individual correlation variables are used to configure the jamming detection system.

11 Claims, 1 Drawing Sheet

(51) Int. Cl.
    *E05F 15/60*     (2015.01)
    *B60J 7/057*     (2006.01)
    *H02P 29/00*     (2016.01)

(58) Field of Classification Search
    USPC .......................................................... 73/1.08
    See application file for complete search history.

(56) References Cited

U.S. PATENT DOCUMENTS

| | | | | |
|---|---|---|---|---|
| 6,472,836 | B1 * | 10/2002 | Uebelein | H02H 7/0851 |
| | | | | 318/434 |
| 6,597,139 | B1 * | 7/2003 | Klesing | H02H 7/0851 |
| | | | | 318/283 |
| 6,753,669 | B2 * | 6/2004 | Spreng | H02H 7/0851 |
| | | | | 318/286 |
| 8,818,646 | B2 * | 8/2014 | Heinrich | H02H 7/0851 |
| | | | | 318/434 |
| 2006/0137252 | A1 * | 6/2006 | Kriese | E05F 15/40 |
| | | | | 49/360 |
| 2007/0133958 | A1 * | 6/2007 | Held | E05F 15/41 |
| | | | | 388/935 |
| 2007/0182352 | A1 * | 8/2007 | Oxle | G05B 19/4061 |
| | | | | 318/453 |

FOREIGN PATENT DOCUMENTS

| | | |
|---|---|---|
| DE | 102005044147 A | 4/2007 |
| DE | 102009008369 A1 | 8/2010 |
| DE | 102009035449 B3 | 2/2011 |
| DE | 102013220515 A1 | 4/2015 |
| EP | 1168591 A1 | 1/2002 |
| JP | H08158741 A | 6/1996 |
| JP | 2007239278 A | 9/2007 |
| JP | 2011094370 A | 5/2011 |
| WO | 0014846 A1 | 3/2000 |
| WO | 2005111748 A1 | 11/2005 |

OTHER PUBLICATIONS

German Patent and Trademark Office. Office Action for application 10 2018 101 069.9, dated Jun. 17, 2020. With Translation.
The State Intellectual Property Office of People's Republic of China, First Office Action, Application No. 201980008914.3, dated Dec. 15, 2021, 15 pages.
Japan Patent Office, Notice of Reasons for Refusal, Application No. 2020-539194, dated Aug. 17, 2021, 8 pages.
Japan Patent Office, Notice of Reasons for Refusal, Application No. 2020-539194, dated Mar. 15, 2022, 8 pages.

* cited by examiner

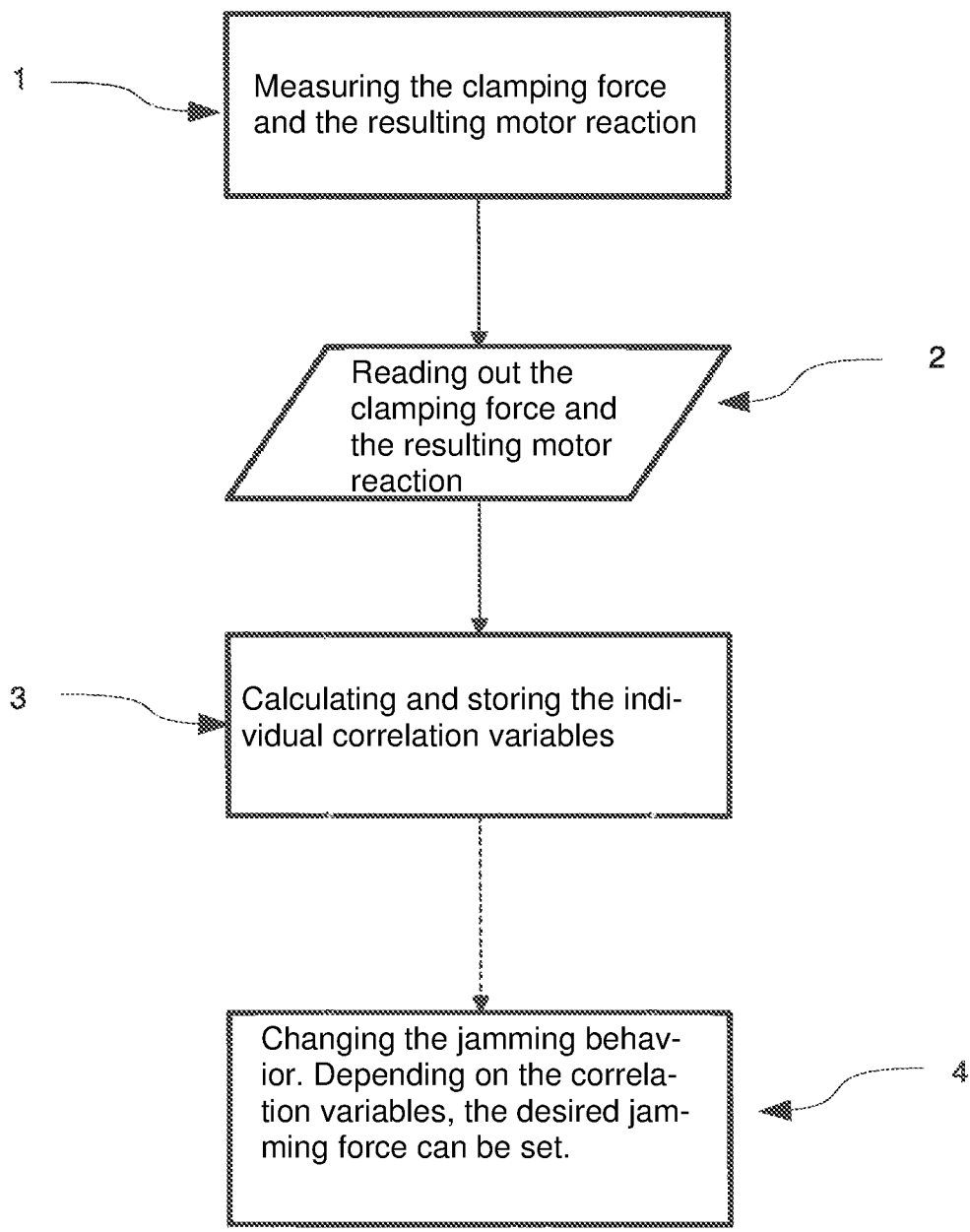

DEVICE AND METHOD FOR CONFIGURING A CLAMPING DETECTION SYSTEM

CROSS-REFERENCE TO RELATED APPLICATIONS

This application represents the National Stage of International Application No. PCT/EP2019/050590, filed Jan. 10, 2019, which claims priority to German Patent Application DE 10 2018 101 069.9, filed Jan. 18, 2018, which disclosures are hereby incorporated by reference for all purposes.

DESCRIPTION

The disclosure relates to a device and a method for configuring a jamming detection system having an adjusting device comprising an electric motor for closing at least one opening in a vehicle, such as a sliding roof.

In the event of adjustment of components in motor vehicles caused by an electric motor, in particular in the case of adjusting devices for electrically operated window lifters or sliding roofs, a jamming protection system shall be provided to limit any excess force generated by the electric motor. This is necessary, inter alia, because the comfort of the passengers of a vehicle is increased if they only have to start the opening or closing movement of the component to be adjusted, for example by actuating once an actuating element for a specific direction, i.e. an opening or closing direction. The opening or closing process is therefore continued even after the actuating element has been released. With such functionality, the passenger does not need to monitor further movement of the component to be adjusted in the motor vehicle. However, there is a risk that parts of the body or objects could be trapped between the moving component and a fixed part. It is also possible, for example, that another person may intentionally or unintentionally actuate the actuating element which causes the opening or closing process, with the result that an object or part of the body may be trapped.

For this reason, electrically adjustable sliding roofs and electrically adjustable window lifters in particular must have a so-called anti-jamming function which detects a jammed object or body part and stops the movement of the component and releases the jammed object or body part. To do this, the movement of the component is stopped and the direction of rotation of the electric motor is reversed.

For example, DE 10 2009 035 449 B3 discloses a method for the time-controlled jamming detection for a window lifter or sliding roof adjustment unit with an electric motor, wherein a value related to a current adjustment force is monitored for exceeding the specified reference value. For this purpose, time intervals related to the instantaneous motor angular velocity during operation of the motor are continuously determined and for each time interval an associated maximum time interval is calculated on the basis of the minimum permissible angular velocity related to the reference value, wherein jamming is detected when this maximum time interval is reached or exceeded by the respective interval related to the instantaneous angular velocity.

The approaches known from the prior art are essentially based on the evaluation of measured motor variables or motor parameters, wherein known and fixed relationships between the clamping force to be recorded and the resulting change in the measured motor variable or motor parameters, such as the current or the change in motor speed, are assumed. In the prior art, it is assumed that these correlations are constant over all manufactured motor vehicles.

A disadvantage of the prior art is that the measured motor variables or motor parameters, such as the motor characteristic curve or the efficiency of the adjusting device and the like, the relationship between the force applied by the electric motor of the adjusting device and the resulting measured motor variables or motor parameters vary due to specimen scatter. These variations also lead to a specimen scatter with regard to the clamping forces and to a specimen scatter with regard to the robustness against false detection of a jamming ("false reversing of the electric motor").

It is therefore the object of the present disclosure to provide a device and a method which eliminate or at least minimize the disadvantages known from the prior art.

This object is solved by a device according to claim 1. Accordingly, a device for configuring a jamming detection system with an adjusting device comprising an electric motor is provided for closing at least one opening in a vehicle such as a sliding roof. The device comprises means for measuring parameters of the electric motor and parameters of the jamming detection system. It also has means for calculating individual correlation variables from the measured parameters of the electric motor and of the jamming detection system. The device also comprises means for storing the calculated individual correlation variables in a motor controller of the adjusting device, wherein the calculated individual correlation variables are used to configure the jamming detection system.

In the context of the present disclosure, the term "jamming" means, in particular, but not exclusively, an undesirable jamming of objects such as an object or a limb such as a person's arm between a fixed and a movable part of an adjusting device.

In particular, the device according to the disclosure has the advantage that the actual individual correlation variables calculated from the measured parameters of the electric motor and the jamming detection system can be used for determining the clamping force and the reversing distance. This leads to a higher precision of the jamming protection and thus to a reduced scatter of the clamping force. A further advantage is the largely cost-neutral extraction of the individual correlation variables from tests already required elsewhere.

In a further embodiment, the individual correlation variables are calculated based on parameters of the electric motor, for example the motor constant and/or the armature resistance, taking into account parameters of the adjusting device.

One advantage of this is that not only the electric motor but also the interaction of the electric motor with the adjusting device can be taken into account. This further increases the precision of the jamming protection and further reduces the associated dispersion of the clamping force.

In a further embodiment, the individual correlation variables have a transmission factor of clamping force to at least one measured variable on the electric motor, in particular speed, voltage, current and/or force. An advantage of this is that not only the parameters of the electric motor are taken into account, but also the efficiency of the force applied by the electric motor to the component of the adjusting device to be adjusted. This leads to a further increase in the precision of the jamming protection and consequently to a further reduction in the spread of the clamping force. It goes without saying that not only the listed measured variables of the electric motor can be used, but also other measured variables which can be measured and/or calculated by an electric motor measurement.

One embodiment provides for the clamping force to be determined by means of at least one clamping force measurement. In this way, a prior-art and fully developed measurement form is used for the clamping force.

The object is also solved, according to the disclosure, by a test stand, which has a device according to one of the preceding embodiments. The advantages of the device are achieved by the test stand according to the disclosure. Using such a test stand, in particular the scattering of the clamping force can be reduced and a higher precision of the jamming protection can be achieved.

Another embodiment of the test stand is an end-of-line test stand. An advantage of this is that it is a prior-art test stand which is technically fully developed and can be implemented without great effort.

In the context of the present disclosure, the term "end-of-line test stand" is to be understood in particular, but not exclusively, as a test stand at the end of a manufacturing process in which newly built motor vehicles or parts thereof are tested for functionality.

In addition, the object is solved according to the disclosure by a method for configuring a jamming detection system having an adjusting device comprising an electric motor for closing at least one opening in a vehicle, such as a sliding roof, wherein the method comprises the following steps:

measuring parameters of the electric motor and parameters of the jamming detection system, calculating individual correlation variables from the measured parameters of the electric motor and parameters of the jamming detection system, storing the calculated individual correlation variables in a drive controller of the adjusting device, and using the calculated individual correlation variables to configure the jamming detection system.

The advantages of the device are achieved by the method according to the disclosure. In particular, the clamping force and the reversing distance can be more closely limited by taking into account the actual correlation variables. The method according to the disclosure also leads to a higher precision of the jamming protection and thus to a reduced scatter of the clamping force. A further advantage is the largely cost-neutral extraction of the individual correlation variables from tests already required elsewhere.

One embodiment provides that the individual correlation variables are calculated based on parameters of the electric motor, for example the motor constant and/or the armature resistance, taking into account parameters of the adjusting device. An advantage of this is that not only the electric motor but also the interaction of the electric motor with the adjusting device can be taken into account. This further increases the precision of the jamming protection and further reduces the associated spread of the clamping force.

One embodiment also provides that the individual correlation variables have a transmission factor from clamping force to at least one measured variable on the electric motor, in particular speed, voltage, current and/or force. This leads to a further increase in the precision of the jamming protection and consequently to a further reduction in the spread of the clamping force.

In addition, the object is solved according to the disclosure by a computer-readable storage medium which receives instructions which cause at least one processor to implement a method according to one of the preceding embodiments when the instructions are carried out by at least one processor.

The computer-readable storage medium according to the disclosure improves the information-technological handling of the method according to the disclosure. The device for configuring a jamming detection system is preferably used for a sliding roof, (side) windows and/or another closable opening in a vehicle (such as a passenger car or truck, ship and/or aircraft), in particular a vehicle body.

Similarly, the object is solved according to the disclosure by a jamming detection system configured according to a method of the preceding embodiments. In this way the advantages of the method and especially the advantages of the device are achieved.

In the following, the disclosure is described by means of an exemplary embodiment, which is explained in more detail by means of an illustration, wherein:

FIG. 1 shows a flow chart of a method for configuring a jamming detection system according to the embodiment.

In the following description, the same reference numerals are used for comparisons and parts having the same effect.

In particular, it should be noted that the individual parameters or the individual correlation variables defining the relationships between forces on a cover of the adjusting device and measured motor variables or motor parameters are determined for each specimen of a motor vehicle, for example, during the final test after assembly of the adjusting device or the electric motor of the adjusting device, and are stored in the motor controller. In particular, motor parameters such as the motor constant and the armature resistance are determined from characteristic curve measurements. Suitable parameters from measurements in the roof system or the adjusting device are also measured on the EOL test stand. The transmission factor from clamping force to force on the electric motor can be determined, for example, from clamping force measurements on the EOL test stand.

In this way, the clamping force and the reversing distance can be narrowed down in the algorithms used, taking into account the actual parameters of the electric motor and the jamming detection system. This leads to a higher precision of the jamming protection and thus to a reduced scatter of the clamping force. The extraction of the individual correlation variables is also largely cost-neutral, as this is done from tests already required elsewhere.

FIG. 1 shows as an example an embodiment of the method according to the disclosure for the configuration of a jamming detection system having an adjusting device comprising an electric motor for closing at least one opening in a vehicle such as a sliding roof and/or a window, in particular a side window. Thus, in a first step 1, the clamping force and the resulting motor reaction are measured. In a second step 2 the measured clamping force and the measured resulting motor reaction are read out. In a third step 3, individual correlation variables are calculated and stored. These calculated individual correlation variables can be stored, for example, in a motor controller of the adjusting device. Not shown is the step following step 3 of using the calculated individual correlation variables to configure the jamming detection. Instead, an optional fourth step, in which the jamming behavior is changed, is shown in the embodiment of FIG. 1. In this way, the desired setting force can be set according to the individual correlation variables.

The invention claimed is:

1. Device for configuring a jamming detection system having an adjusting device comprising an electric motor for closing at least one opening in a vehicle, such as a sliding roof, comprising at least one processor which is configured to:
- read measured parameters of the electric motor and parameters of the jamming detection system,
- calculate individual correlation variables from the measured parameters of the electric motor and of the jamming detection system, and
- store the calculated individual correlation variables, wherein the calculated individual correlation variables are used to configure the jamming detection system, and wherein the individual correlation variables have a transmission factor from clamping force to at least one measured variable on the electric motor.

2. Device according to claim 1, wherein the individual correlation variables are calculated based on parameters of the electric motor, for example the motor constant and/or the armature resistance, taking into account parameters of the adjusting device.

3. Device according to claim 1, wherein the clamping force is determined by means of at least one clamping force measurement.

4. Test stand having a device according to claim 1.

5. Test stand according to claim 4, wherein the test stand is an end-of-line test stand.

6. Method for configuring a jamming detection system having an adjusting device comprising an electric motor for closing at least one opening in a vehicle, such as a sliding roof, wherein the method comprises the following steps:
- measuring parameters of the electric motor and parameters of the jamming detection system,
- calculating individual correlation variables from the measured parameters of the electric motor and parameters of the jamming detection system,
- storing the calculated individual correlation variables in a drive controller of the adjusting device, and
- using the calculated individual correlation variables for configuring the jamming detection system, wherein the individual correlation variables have a transmission factor from clamping force to at least one measured variable on the electric motor, in particular speed, voltage, current and/or force.

7. Method according to claim 6, wherein the individual correlation variables are calculated based on parameters of the electric motor, for example the motor constant and/or the armature resistance, taking into account parameters of the adjusting device.

8. Computer-readable storage medium containing instructions causing at least one processor to implement a method according to claim 6 when the instructions are carried out by at least one processor.

9. Jamming detection system configured according to a method of claim 6.

10. Device according to claim 1 wherein the at least one measured variable on the electric motor is at least one of a speed, a voltage, a current, and a force.

11. Device according to claim 1, wherein the processor is further configured to store the calculated individual correlation variables in a motor controller of the adjusting device.

* * * * *